United States Patent [19]
Hempel et al.

[11] Patent Number: 5,397,157
[45] Date of Patent: Mar. 14, 1995

[54] BELLOWS WITH SCREW THREAD FOLDS AND LUG AND SLOT END CONNECTORS

[75] Inventors: Jürgen Hempel, Weinheim; Gerhard Müller-Broll, Rimbach, both of Germany

[73] Assignee: Firma Carl Freudenberg, Weinheim, Germany

[21] Appl. No.: 215,236

[22] Filed: Mar. 21, 1994

[30] Foreign Application Priority Data

Mar. 31, 1993 [DE] Germany .................. 43 10 510.6

[51] Int. Cl.⁶ .................. F16J 15/52; F16L 27/107
[52] U.S. Cl. .................. 285/227; 285/299; 285/402; 277/212 FB; 92/34
[58] Field of Search .............. 277/212 FB; 92/45, 47, 92/34; 285/226, 227, 228, 299, 401, 402

[56] References Cited

U.S. PATENT DOCUMENTS

| | | | |
|---|---|---|---|
| 1,864,861 | 6/1932 | Schaller | 285/226 |
| 1,978,529 | 10/1934 | Harrah | 285/226 |
| 4,306,743 | 12/1981 | Hinshaw et al. | 285/402 |
| 4,313,626 | 2/1982 | Duncan | 285/402 |
| 4,314,717 | 2/1982 | Bjurman | 285/226 |
| 4,477,109 | 10/1984 | Kleuver | 285/402 |
| 4,676,513 | 6/1987 | Tiegs et al. | 277/212 FB |
| 4,708,370 | 11/1987 | Todd | 285/396 |
| 5,050,894 | 9/1991 | Merel et al. | 277/212 FB |
| 5,236,204 | 8/1993 | Hempel | 277/212 FB |

FOREIGN PATENT DOCUMENTS

| | | | |
|---|---|---|---|
| 1169220 | 12/1958 | France | 92/47 |
| 1301318 | 7/1962 | France | 285/402 |
| 2622947 | 5/1989 | France | 277/212 FB |
| 1559645 | 1/1980 | United Kingdom | 277/212 FB |

OTHER PUBLICATIONS

Abstract of GM 82 00 937, Elastrogran Kunststoff-Technik GmbH, Lemforde, DE, Sep. 16, 1982.

*Primary Examiner*—Eric K. Nicholson
*Attorney, Agent, or Firm*—Kenyon & Kenyon

[57] ABSTRACT

A bellows that is affixable by way of a connecting sleeve to a machine part, and is made of polymer material and has folds formed, at least in one partial area, in the shape of a screw thread. The connecting sleeve is provided with at least two retaining elements that are distributed in the circumferential direction and project inwardly and/or outwardly from the top surface of the connecting sleeve, the retaining elements being able to be forced into engagement with snap-in locking elements of the machine part, which exhibit a groove following the direction of the folds.

16 Claims, 6 Drawing Sheets

BELLOWS WITH SCREW THREAD FOLDS AND LUG AND SLOT END CONNECTORS

BACKGROUND OF THE INVENTION

The invention relates to a bellows that is affixable by way of a connecting sleeve to a machine part. It is made of polymer material and has folds formed, at least in one partial area, in the shape of a screw thread.

Such a bellows is disclosed by the German utility model patent 82 00 937. The bellows consists of an elastomer and essentially has uniform folds designed in a helical shape. The folds are subdivided into two axially adjacent sections having a relatively oppositely directed pitch.

In previously known types of bellows, hose clips are needed to attach the connecting sleeves to the machine part. This is disadvantageous from a standpoint of assembly technology.

SUMMARY OF THE INVENTION

An object of the invention is to further develop a bellows of the previously known type, so as to allow a simplified attachment of the bellows to a corresponding machine part.

This objective is solved according to the invention by the features set forth in the attached claims.

In accordance with the present invention, the connecting sleeve is provided with at least two retaining elements that are spaced apart in the circumferential direction and that project either inwardly or outwardly from top surface of the connecting sleeve. These retaining elements are able to be forced into engagement with locking elements of the machine part.

By designing the folds of the bellows as threads, the bellows can be shortened axially when it is twisted in the threaded direction. This axial shortening is utilized to achieve a simple attachment to the machine part. Thus, when the bellows is compressed, by twisting, the retaining elements are positioned into engagement with the locking elements. Upon release of the bellows, the retaining elements turn by virtue of the tendency of the bellows to return to its equilibrium state. Each locking element has an undercut groove following the direction of the folds of the bellows. The tendency of the bellows to return to its equilibrium state thereby forces the retaining elements to turn in the undercut grooves to produce a secure connection with the machine part. Thus, when the bellows is released, the retaining elements are automatically secured inside the snap-in locking elements by virtue of the undercut grooves.

If the connection areas of the ends of the bellows are displaced axially relative to one another during normal operational use, the retaining elements are either forced in the closing direction or moved toward the opening direction, depending upon the orientation of the bellows thread. To prevent a release of the retaining elements during axial displacements, secondary auxiliary devices, such as snap-fit connections for example, may be used. Durable connections can be achieved with this type of bellows without having to apply costly connection methods.

The bellows can be used, for example, as an air guide duct to carry intake air to an air filter, air from the filter to be compressed, air from the compressor to the cooler, and/or air from the cooler to the ultimate consumer. The rubber-elastic properties of the bellows make it possible to interconnect aggregates existing in virtually any desired configuration.

The retaining elements can consist, for example, of projections that extend in the radial direction. According to one embodiment the retaining elements can extend inwardly in the radial direction. This embodiment is advantageous in that the bellows does not have any protruding projections in the area of its connecting sleeve that could become damaged during storage. Moreover, in this embodiment the machine part which is joined after assembly to the bellows may be machined in its connection area from the outside. The locking elements can be machined, for example, into the outer surface of the machine part. This is advantageous from a standpoint of production engineering and economics.

According to another embodiment, the retaining elements can project from the connecting sleeve radially to the outside. This case is advantageous in that, given essentially the same outer bellows dimensions as the first embodiment, a relatively enlarged flow-through opening can be achieved. In this embodiment, in the area of its inner circumference, the tubular machine part has locking elements that are able to engage the retaining elements.

One advantageous embodiment provides for three retaining elements to be uniformly distributed in the circumferential direction. This enables canting strains to be minimized in the vicinity of the connecting sleeve. In addition, compared to configurations with a smaller number of locking elements, this reduces the mechanical stress to which the retaining elements are subjected, the retaining elements being formed, like the rest of the bellows, of a polymer material.

The threaded folds can be designed to have, for example, 1 to 10 turns, or, in one preferred embodiment, 2 to 4 turns. The multiple-thread formation of the threaded folds provides for a large axial resiliency when the bellows is subjected to torsion. The 2 to 4-threaded designs are preferably used for bellows having small axial dimensions.

The bellows can be bounded in the axial direction by a connecting sleeve on each of the two sides. Depending upon the configuration of the machine part to which the connecting sleeve of the bellows is supposed to be connected, the pitch of the threaded folds may be formed so as to allow the bellows and the machine part to be automatically connected. This automatic connection occurs when the bellows assumes its original length subsequent to the initial axial compression and the engagement of the retaining elements with the locking elements. The pitch of the helical folds in the area of the two connecting sleeves has to be designed to run in the same direction.

On the side of the threaded folds facing away from their corresponding connecting sleeve, the threaded folds can be connected to blend together in one piece with a cylindrical portion of the bellows which has concentric, parallel running folds in at least one partial area of its axial extent. The entire bellows is advantageously designed in this case in only one piece, thus considerably reducing expenditure for manufacturing and assembly. The bellows with its concentric, parallel running folds enables the two connecting sleeves that constitute the axial ends of the bellows to function independently from one another. The bellows demonstrates good axial and radial mobility. However, this region certainly offers considerable resistance to torsional strain.

The bellows can be designed in the region outside of the folds as an inherently more rigid air guide duct. The entire bellows, inclusive of the air guide duct, consists of a polymer material. Hard and soft segments are able to follow one another in the axial direction, so that the relatively softer bellows and the relatively harder connecting tube can be manufactured as one structural element. Therefore, hose clamps are no longer needed to join the individual sections of the bellows.

BRIEF DESCRIPTION OF THE DRAWINGS

FIG. 3b shows a partial cross-sectional view of the machine part of FIG. 3a taken along line 3b—3b in FIG. 3a;

FIG. 6b shows a partial cross-sectional view of the machine part of FIG. 6a taken along line 6b—6b in FIG. 6a.

DETAILED DESCRIPTION OF THE INVENTION

Figure 1:
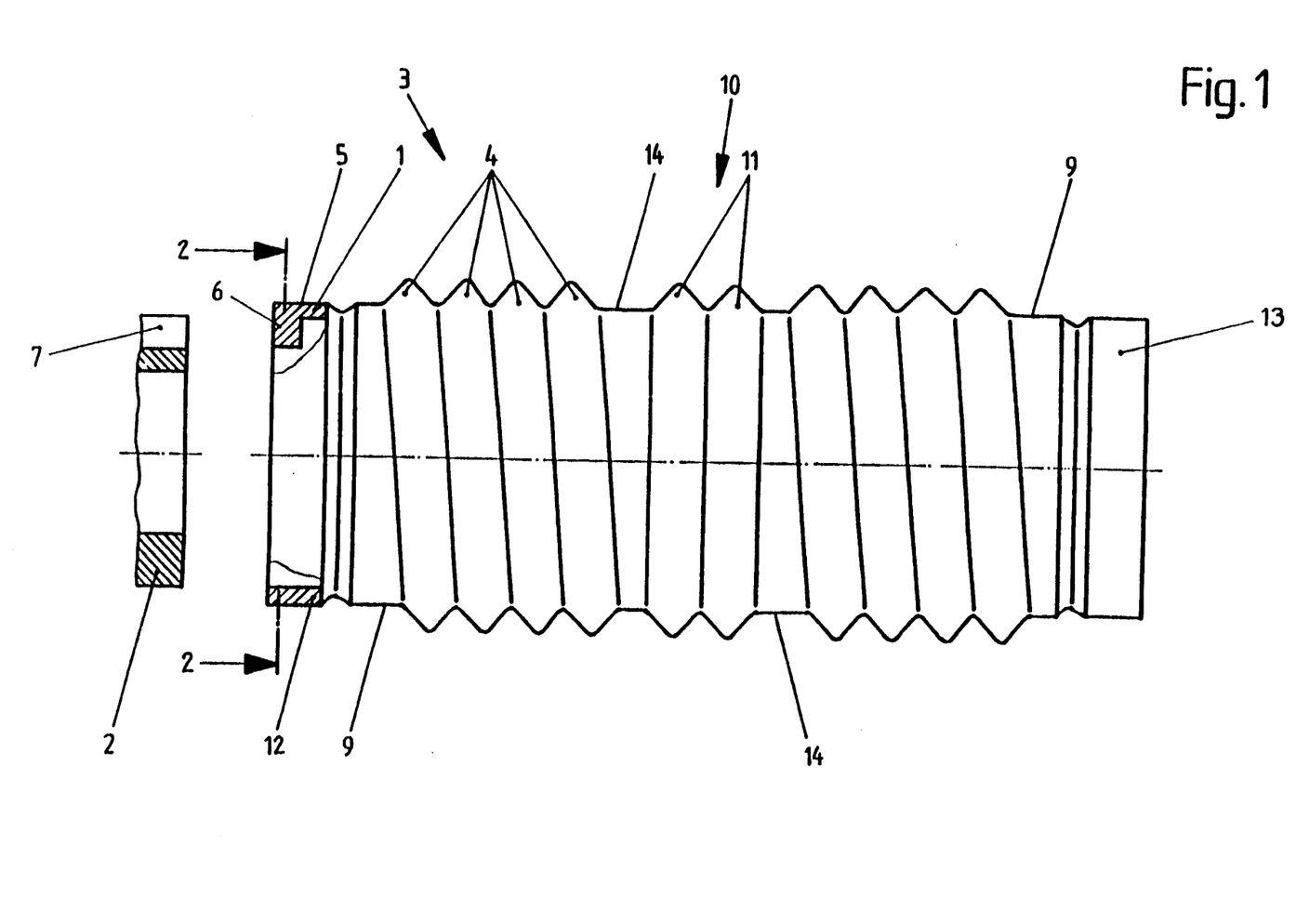
FIG. 1 shows a first embodiment of the bellows, in which the retaining elements of the connecting sleeve project to the inside in the radial direction.
Figure 4:
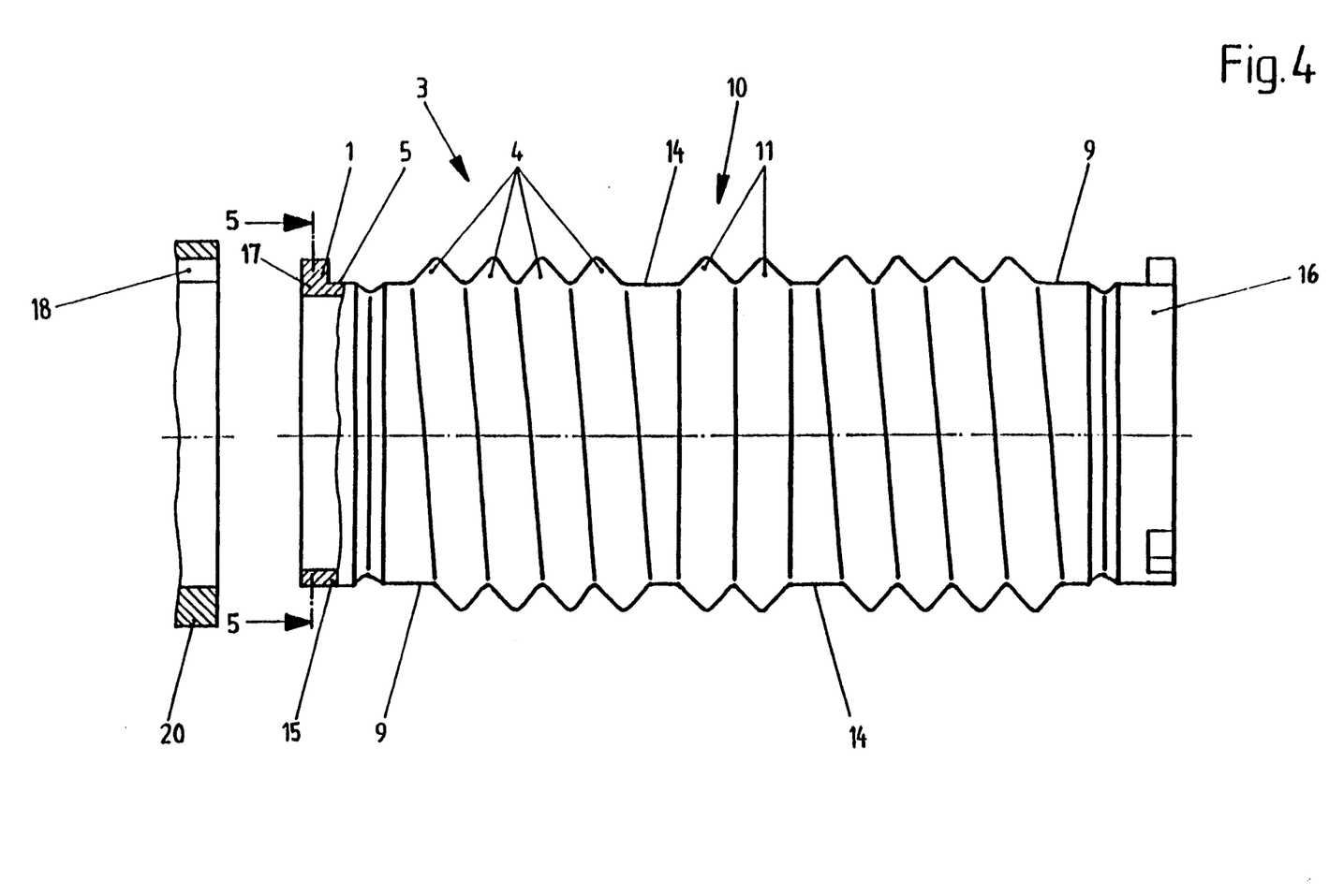
FIG. 4 shows a second embodiment of the bellows, in which the retaining elements project outwardly in the radial direction.

FIGS. 1 and 4 show exemplified embodiments of the bellows according to the invention. The bellows 3 has connecting sleeves 1 on both sides in the axial direction. The entire bellows 3 is formed as a continuous piece and is made of a polymer material, for example rubber. In the exemplified embodiments shown here, the folds of the bellows have a threaded formation in each partial area adjoining the connecting sleeves 1, which formation enables the bellows to achieve a linear deformation in the axial direction when subjected to torsional force. The direction of the folds of the bellows can be described with reference to an end view of the bellows. For example, when the bellows of FIG. 1 is viewed from the left end, the folds have a counterclockwise direction. That is, as the "thread" approaches that end of the bellows, it turns in a counterclockwise direction as viewed from that end. When that end is twisted in that counterclockwise direction with respect to the other end of the folds, the bellows compresses in the axial direction.

In FIG. 1, the connecting sleeves 12, 13 are provided with three retaining elements 6 that are uniformly distributed in the circumferential direction and that project radially inwardly in the direction of the flow-through cross-section of the bellows 3. Adjoining each of the connecting sleeves 12, 13 in the axial direction are a rigid portion 9, threaded folds 4, an additional rigid portion 14 and, after that, a bellows portion 10 having concentrically arranged folds 11 running parallel to one another.

Figure 2:
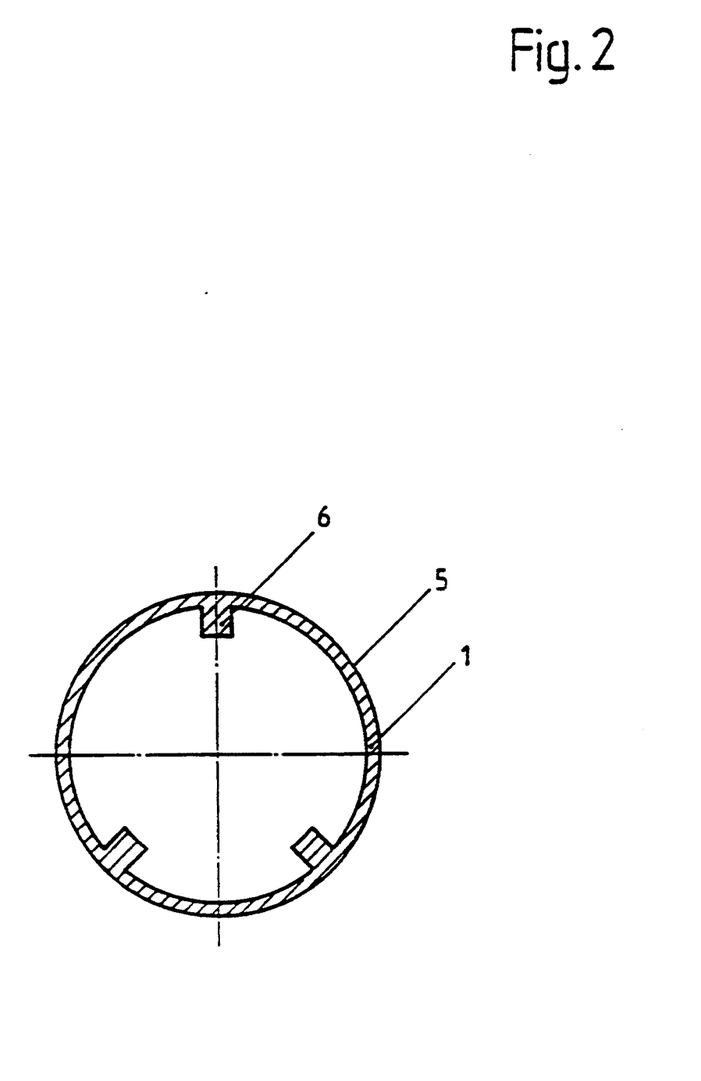
FIG. 2 shows a cross-sectional view of the bellows of FIG. 1 taken along line 2—2 in FIG. 1.

FIG. 2 shows a cross-section through the bellows 3 of FIG. 1 taken along line 2—2. The three retaining elements 6, which are uniformly spaced in the circumferential direction, project inwardly from the outer surface 5.

Figure 3A:
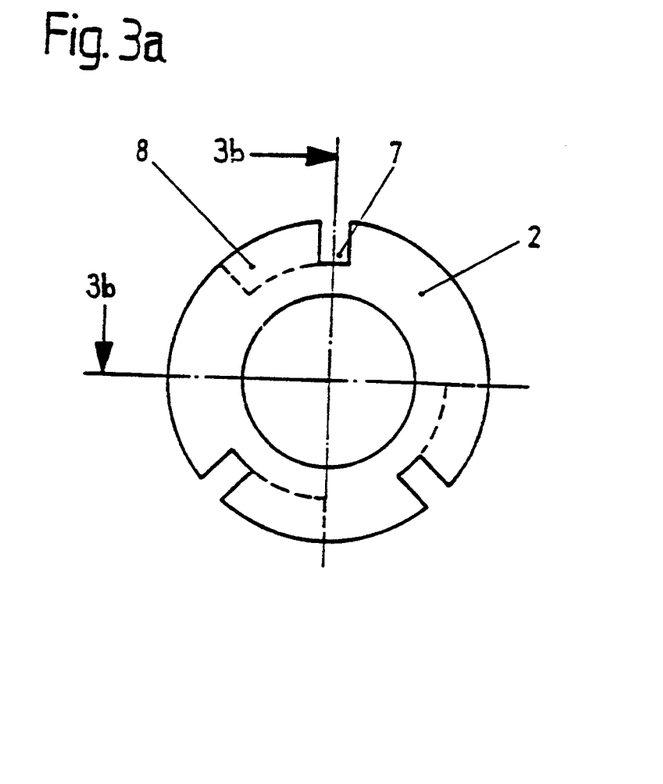
FIG. 3a shows a view of the front side of a machine part with which the bellows of FIG. 1 is able to be forced into engagement.
Figure 3B:
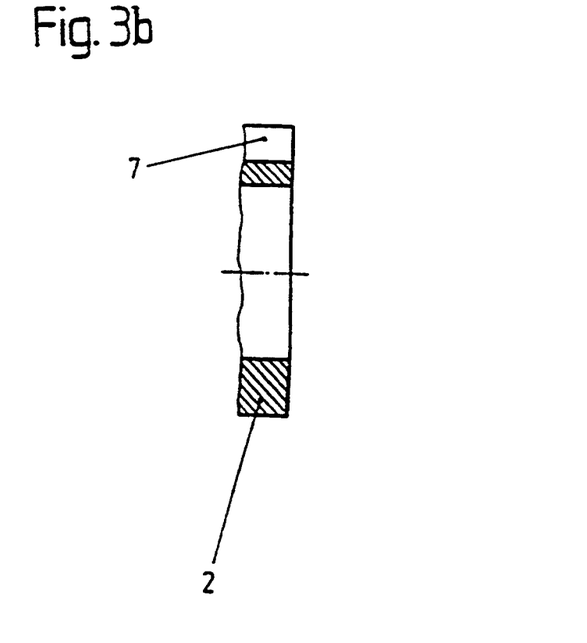

FIG. 3a depicts the front side of the machine part 2 that is shown in a cut-away view in FIG. 1. FIG. 3b, which represents a partial cross-sectional view taken along the line 3b—3b in FIG. 3a, corresponds to the view of the machine part 2 depicted in FIG. 1. The locking elements 7 are formed by recesses that open outwardly in the radial direction. Adjacent each recess is a groove undercut 8 formed in the direction of the folds of the corresponding part of the bellows 3. That is, each groove undercut 8 is formed so that the retaining element travels along the groove away from the opening of the locking element 7 when the bellows expands. In FIG. 3a, the groove undercuts 8 are formed in a counterclockwise direction away from the openings.

To connect the bellows 3 to the machine part 2, the bellows 3 is first compressed until the connecting sleeves 12, 13 are positioned to axially adjoin corresponding machine parts 2. The retaining elements 6 of the bellows 3 are then inserted into the locking elements 7 of the machine part 2. The compression on the bellows 3 is released, and the subsequent axial expansion of the bellows 3 biases the retaining elements 6 in the circumferential direction so that they engage with the inner boundary walls of the locking elements 7, with the retaining elements 6 automatically snapping into the undercuts 8.

Because the undercut grooves 8 are formed in the direction of the folds of the bellows, the force of the bellows 3 presses the retaining element in the closing direction, thus preventing the bellows from becoming unintentionally detached. One can prevent any loosening of the connection, when it is subjected to pressure, by selecting the dimensions of the bellows and its relative torsion so as to allow the retaining elements and the locking elements to still be in engagement in the event of maximum allowable axial compression of the bellows 3. If needed, a safety mechanism can additionally be provided and can consist, for example, of a mechanically operated locking device in the vicinity of the undercuts 8.

FIG. 4 shows a second exemplified embodiment, which has essentially identical outer dimensions to the bellows 3 shown in FIG. 1, but clearly has an enlarged flow-through cross-section. This is achieved by the configuration of the retaining elements 17, which in this embodiment project to the outside from the top surfaces 5 of the connecting sleeves 15, 16 in the radial direction. This illustrated embodiment, like that shown in FIG. 1, has three retaining elements 17 that are uniformly spaced in the circumferential direction. They are configured to be inserted in appropriately shaped locking elements 18 of the machine part 20 and in adjacent undercuts 19.

Figure 5:
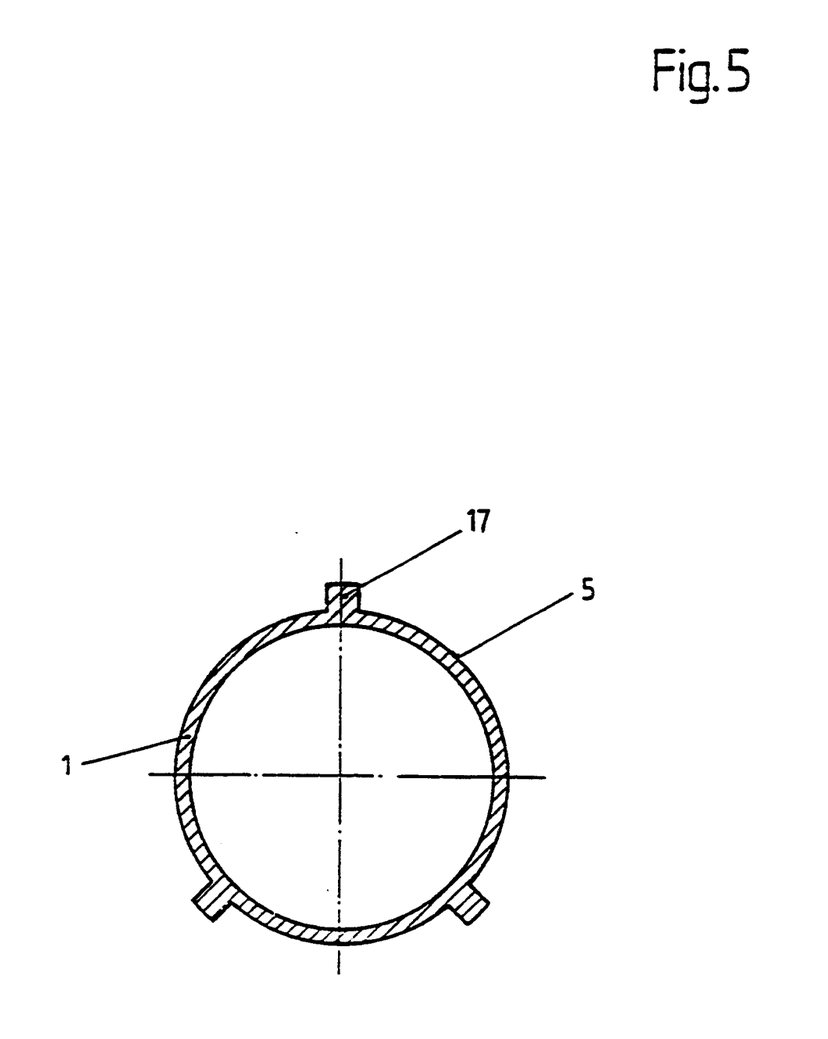
FIG. 5 shows a cross-sectional view of the bellows of FIG. 4 taken along line 5—5 in FIG. 4.
Figure 6A:
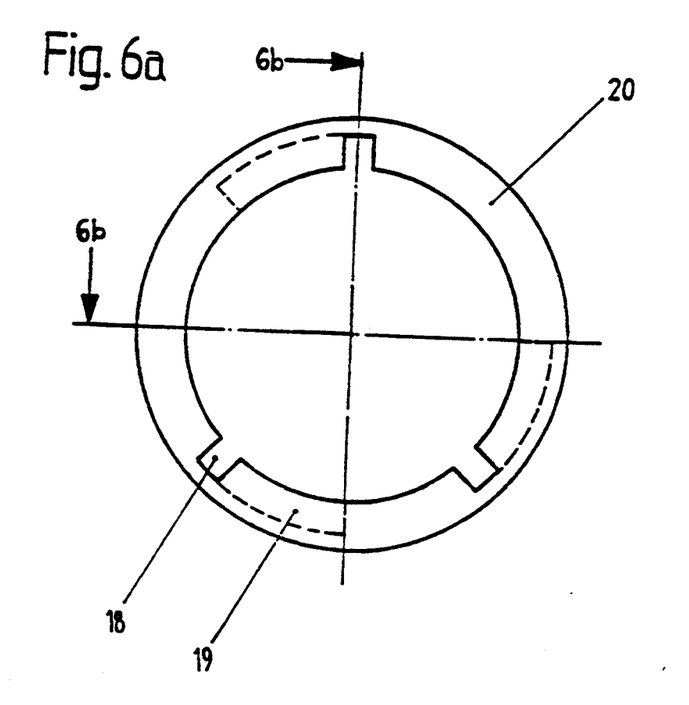
FIG. 6a shows a view of the front side of a machine part with which the bellows of FIG. 4 is able to be forced into engagement.
Figure 6B:
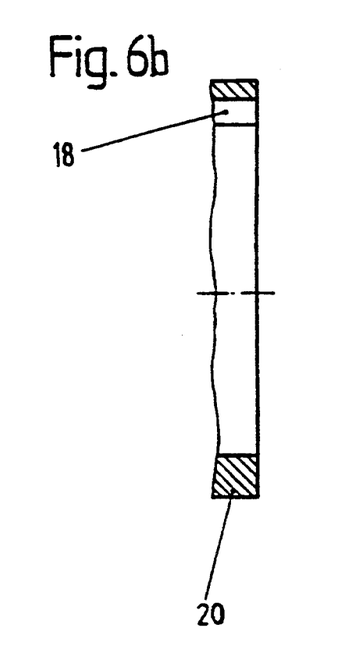

FIG. 5 depicts a cross-section through the bellows 3 of FIG. 4 along the line 5—5. FIG. 6a depicts the front side of the machine part 20, which is shown in a cut-away view in FIG. 4. FIG. 6b, which represents a partial cross-sectional view taken along the line 6b—6b in FIG. 6a, corresponds to the view of the machine part 20 depicted in FIG. 4. As can be seen from FIG. 6a, the relatively enlarged flow-through cross-section results in enlarged outer dimensions in the area of the connecting sleeve and of the machine part 20.

The bellows 3 and the machine part 20 are connected as described previously.

What is claimed is:

1. A bellows assembly comprising a bellows capable of being connected to a machine part by way of a connecting sleeve part, wherein said bellows is comprised of a polymer material and comprises folds formed, at least in one partial area, in the shape of a screw thread, wherein said folds are arranged so that said bellows is axially compressed when said connecting sleeve part is twisted in a first rotational direction, wherein said connecting sleeve part is provided with at least two retaining elements distributed circumferentially which project inwardly from a top surface of said connecting sleeve part, and wherein said retaining elements are configured to be forced into engagement with locking elements of said machine part, which locking elements each comprise a groove undercut, and wherein said groove undercuts are arranged so that when said connecting sleeve part is twisted in the first rotational direction and then released, said connecting sleeve part moves in a second rotational direction and causes said retaining elements to move along said groove undercuts.

2. The bellows assembly according to claim 1, wherein the retaining elements comprise projections.

3. The bellows assembly according to claim 1, wherein three retaining elements are uniformly distributed in the circumferential direction.

4. The bellows assembly according to claim 1, wherein the threaded folds have 1 to 10 turns.

5. The bellows assembly according to claim 1, wherein the threaded folds to have 2 to 4 turns.

6. The bellows assembly according to claim 1, wherein said bellows has a connecting sleeve part on each of two ends in the axial direction.

7. The bellows assembly according to claim 1, wherein on one side of the threaded folds, the threaded folds are continuous and integral with at least one partial area of the bellows having concentric, parallel running folds.

8. The bellows assembly according to claim 7, wherein the bellows comprises a rigid air guide duct adjacent said parallel running folds.

9. A bellows assembly comprising a bellows capable of being connected to a machine part by way of a connecting sleeve part, wherein said bellows is comprised of a polymer material and comprises folds formed, at least in one partial area, in the shape of a screw thread, wherein said folds are arranged so that said bellows is axially compressed when said connecting sleeve part is twisted in a first rotational direction, wherein said connecting sleeve part is provided with at least two retaining elements distributed circumferentially which project outwardly from a top surface of said connecting sleeve part, and wherein said retaining elements are configured to be forced into engagement with locking elements of said machine part, which locking elements each comprise a groove undercut, and wherein said groove undercuts are arranged so that when said connecting sleeve part is twisted in the first rotational direction and then released, said connecting sleeve part moves in a second rotational direction and causes said retaining elements to move along said groove undercuts.

10. The bellows assembly according to claim 9, wherein the retaining elements comprise projections.

11. The bellows assembly according to claim 9, wherein three retaining elements are uniformly distributed in the circumferential direction.

12. The bellows assembly according to claim 9, wherein the threaded folds have 1 to 10 turns.

13. The bellows assembly according to claim 9, wherein the threaded folds to have 2 to 4 turns.

14. The bellows assembly according to claim 9, wherein said bellows has a connecting sleeve part on each of two ends in the axial direction.

15. The bellows assembly according to claim 9, wherein on one side of the threaded folds, the threaded folds are continuous and integral with at least one partial area of the bellows having concentric, parallel running folds.

16. The bellows assembly according to claim 15, wherein the bellows comprises a rigid air guide duct adjacent said parallel running folds.

* * * * *

UNITED STATES PATENT AND TRADEMARK OFFICE
CERTIFICATE OF CORRECTION

PATENT NO. : 5,397,157
DATED : March 14, 1995
INVENTOR(S) : Jurgen Hempel et al

It is certified that error appears in the above-indentified patent and that said Letters Patent is hereby corrected as shown below:

Column 1, line 51: Delete "snap-in".

Signed and Sealed this

Twelfth Day of November, 1996

Attest:

BRUCE LEHMAN

*Attesting Officer*  *Commissioner of Patents and Trademarks*